United States Patent
Hopt

(10) Patent No.: US 11,537,802 B2
(45) Date of Patent: Dec. 27, 2022

(54) CARD READER WITH SHIM ATTACK DETECTON

(71) Applicant: ddm hopt + schuler GmbH & Co. KG, Rottweil (DE)

(72) Inventor: Karl-Rudolf Hopt, Rottweil (DE)

(73) Assignee: DDM HOPT + SCHULER GMBH & CO. KG, Rottweil (DE)

( * ) Notice: Subject to any disclaimer, the term of this patent is extended or adjusted under 35 U.S.C. 154(b) by 0 days.

(21) Appl. No.: 16/848,545

(22) Filed: Apr. 14, 2020

(65) Prior Publication Data
US 2020/0342184 A1    Oct. 29, 2020

(30) Foreign Application Priority Data
Apr. 29, 2019 (EP) .................................. 19171484

(51) Int. Cl.
G06K 7/00    (2006.01)

(52) U.S. Cl.
CPC .......... *G06K 7/003* (2013.01); *G06K 7/0026* (2013.01)

(58) Field of Classification Search
CPC .................................................... G06K 7/003
USPC ....................................................... 235/441
See application file for complete search history.

(56) References Cited

U.S. PATENT DOCUMENTS

| | | | |
|---|---|---|---|
| 5,259,777 A * | 11/1993 | Schuder | G06K 7/0021 200/51.1 |
| 2005/0031490 A1 * | 2/2005 | Gumbrecht | B01L 3/502715 422/63 |
| 2016/0028404 A1 * | 1/2016 | Berke | G06F 21/85 377/94 |
| 2017/0018135 A1 * | 1/2017 | Sakamaki | G06K 13/08 |
| 2019/0005503 A1 * | 1/2019 | Hecker | G06K 7/0013 |
| 2019/0286856 A1 * | 9/2019 | Shiomi | G06K 13/067 |

FOREIGN PATENT DOCUMENTS

| | | |
|---|---|---|
| EP | 0 516 943 A1 | 12/1992 |
| EP | 3 012 783 A1 | 4/2016 |
| WO | 2017/142414 A1 | 8/2017 |

* cited by examiner

*Primary Examiner* — Rafferty D Kelly
(74) *Attorney, Agent, or Firm* — Hackler Daghighian Martino & Novak

(57) ABSTRACT

A card reader for data exchange uses a chip card inserted into a card reader housing up to a data exchange position having an electrical contact arranged fixedly in the card reader housing or displaceably in the card insertion direction. In the data exchange position, projecting into the card path of the inserted chip card by way of a contact area, includes a detector device. In the case of a contact fixedly arranged in the card reader housing, the detector device is directed at the contact face of the contact or at the region around said contact face or which, in the case of a contact that is displaceably arranged in the card reader housing in the card insertion direction, is directed at the position in the card reader at which the contact face is located in the data exchange position, or is directed at the region around this position.

16 Claims, 3 Drawing Sheets

CARD READER WITH SHIM ATTACK DETECTON

CROSS-REFERENCE TO RELATED APPLICATIONS

This application claims priority to European Patent Application No. EP 19 171 484.9 filed on Apr. 29, 2019, the entire contents of which are hereby incorporated in full by this reference.

DESCRIPTION

Field of the Invention

The present invention relates to a card reader for data exchange with a chip card that has been inserted into a card reader housing up to a data exchange position, comprising at least one electrical contact that is arranged fixedly in the card reader housing or displaceably in the card insertion direction and that, in the data exchange position, projects into the card path of the inserted chip card by way of a contact area.

Background of the Invention

Such card readers are well known.

SUMMARY OF THE INVENTION

For manipulation purposes, a manipulation foil having an adhesive outer side can be applied onto the underside of a chip card. When such a prepared chip card is inserted, the manipulation foil then adheres to the contacts. If a chip card is inserted again, the contacts then bear against the contact fields of the chip card via the interposed manipulation foil. The manipulation foil has electrical vias in the region of the contacts that continue to maintain the electrical connection between the contacts and the contact fields. In addition, the manipulation foil carries an interface that is wirelessly retrievable from the outside (e.g. in the form of a transmitter) and that is connected to the via assigned to an I/O contact to read the data transmitted via the I/O contact for manipulation purposes (known as shimming attack).

In this respect, it is the object of the present invention to reliably detect such a shimming attack in a card reader of the type mentioned in the introductory part.

This object is achieved according to the invention by at least one detector device, which, in the case of a contact that is fixedly arranged in the card reader housing, is directed at the contact face of the contact or at the region around said contact face or which, in the case of a contact that is displaceably arranged in the card reader housing in the card insertion direction, is directed at the position in the card reader at which the contact face is located in the data exchange position, or is directed at the region around this position.

According to the invention, the detector device checks if a manipulation foil is arranged in the region of the contact face or at the position in the card reader at which the contact face is located in the data exchange position. The manipulation foil can be, for example, a flexible line or a foil with contact material that is suitable for continuing to maintain the electrical connection between the contacts and contact fields and also for tapping the transmitted data for manipulation purposes.

The card reader preferably has a bearing face, against which the inserted chip card bears in the data exchange position, wherein, in the data exchange position, the at least one contact reaches through a through-opening in the bearing face. According to the invention, the bearing face serves to detach a manipulation film, which initially adheres to the contacts, from the contacts and to then pick it up itself.

With particular preference, the at least one contact is attached to a contact carrier, which is guided in the card reader housing so as to be displaceable in the insertion direction of the chip card between a starting position and an end position and is carried along by an inserted chip card up to the end position in which the at least one contact is moved through the through-opening for bearing against the inserted chip card. When moving the contact carrier for bearing against the inserted chip card, the contacts are pushed against the manipulation foil, which adheres thereto. Upon a subsequent movement of the contact carrier away from the inserted chip card, the manipulation foil is detached from the contacts by way of the bearing face and then adheres to the large-area bearing face.

The at least one detector device can be attached to the displaceable contact carrier or fixedly to the card reader housing.

The at least one detector device can advantageously be embodied as a one-way light barrier passing for example through the through-opening, as a reflection light barrier directed for example at the contact face or at the through-opening, as a camera directed for example at the contact face or at the through-opening, or as an inductive sensor directed for example at the contact face or at the through-opening. Conditions are recorded using the detector device in each case before and after the insertion of a chip card and then subsequently compared to one another. Any deviation that is ascertained in the comparison is detected as a shimming attack by monitoring electronics, and a reading process of the card reader is then no longer permitted.

Further advantages of the invention are apparent from the description, the claims, and the drawing. The aforementioned features and the features mentioned further below can likewise be employed in each case by themselves or in any desired combination. The embodiment shown and described should not be understood to be an exhaustive list, but rather as having an exemplary character for the purpose of illustrating the invention.

DETAILED DESCRIPTION OF THE PREFERRED EMBODIMENTS

Figure 1A:
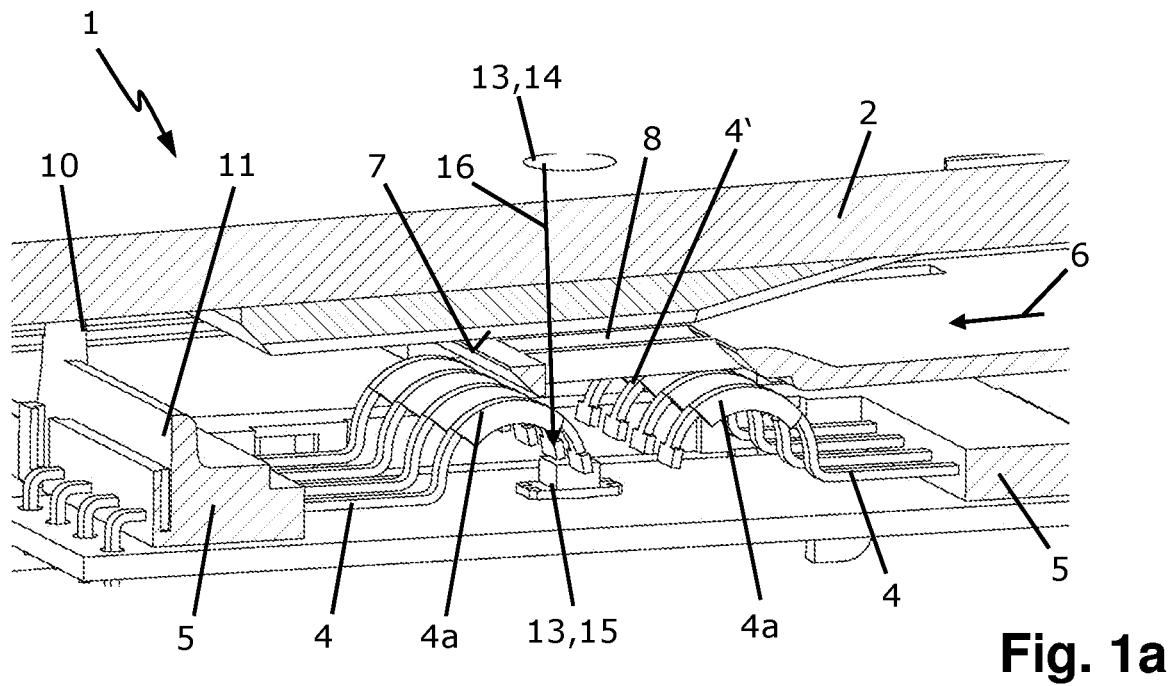
FIGS. 1a, 1b show a longitudinal sectional view of the card reader according to the invention with a detector device embodied as a one-way light barrier (FIG. 1a) and a plan view from above of a contact carrier of the card reader (FIG. 1b)
Figure 1B:
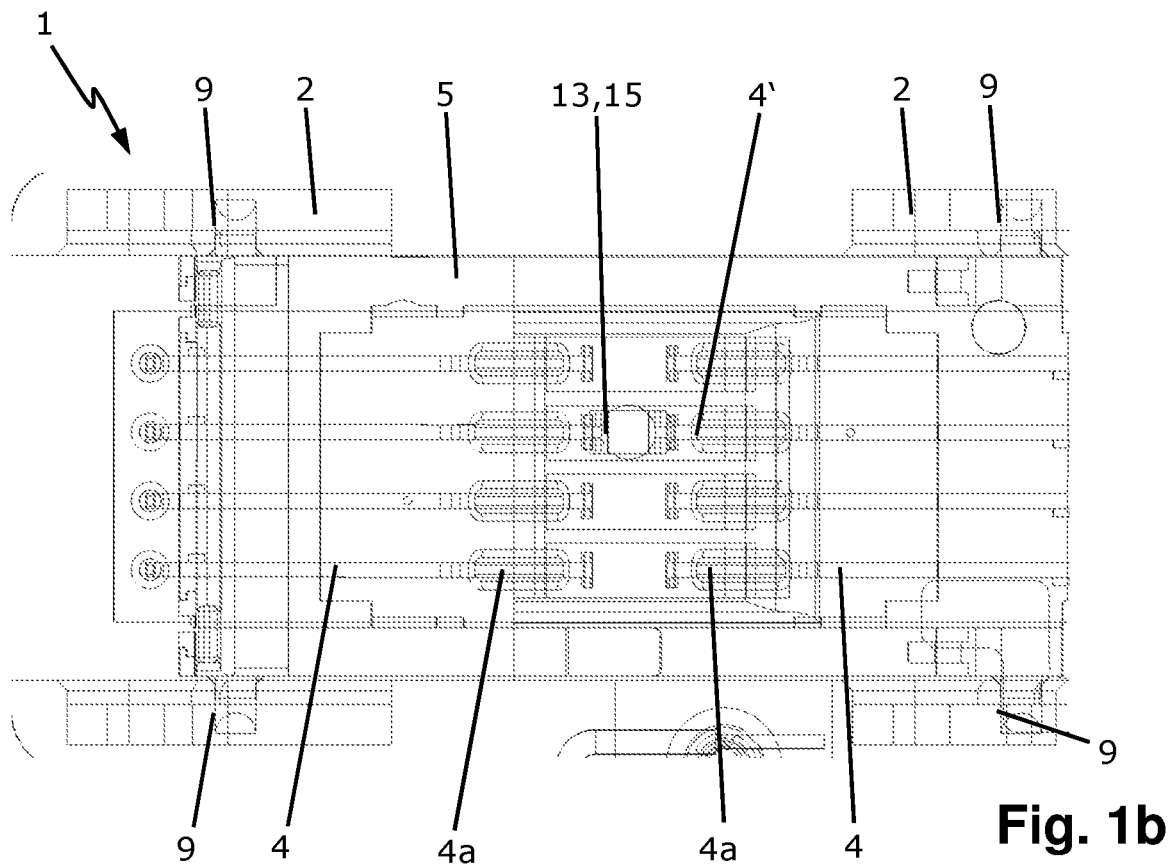

The card reader 1 shown in FIGS. 1a, 1b serves for the data exchange with a chip card 3 that has been inserted into a card reader housing 2 up to a data exchange position and is often also referred to as a smartcard or an integrated circuit card (ICC). The chip card 3 carries a microchip (not shown) for storing the data, the contacts of which are provided in the form of electrical contact fields (not shown) on the card surface.

For making contact with the contact fields of the chip card 3, the card reader 1 has a plurality of contacts 4 (in this case eight contacts over two rows having four contacts each) in the form of elastically deformable contact springs, which, in the data exchange position, project into the card path by way of their free contact ends (contact faces) 4a. In this case, the actual data exchange with the microchip of the chip card 3 takes place only via one of the contacts 4, specifically via the so-called I/O contact 4'. The contacts 4 are attached to a contact carrier 5, which is guided in the card reader housing 2 so as to be displaceable in the insertion direction 6 of the chip card 3 between a starting position (FIG. 2a) and an end position (FIG. 2b) and is carried along by a chip card 3 that is inserted up into the end position counter to the action of a restoring spring (not shown). In the data exchange position, the chip card 3 bears against a housing-side bearing face 7 having a through-opening 8 for each of the contacts 4 through which the contacts 4 are lifted for bearing against the inserted chip card 3. Owing to the inserted chip card 3, the contact faces 4a are deflected out of the card path and make contact with the electrical contact fields of the chip card 3 in the data exchange position.

As is shown in FIG. 1b, the contact carrier 5 has on both its sides in each case two guiding pins 9, which are guided in a slotted guide 10, which rises at an angle with respect to the insertion direction 6, of the card reader housing 2 for lifting the contact carrier 5 which is carried along by the chip card 3 in the insertion direction 6 until the contacts 4 have been lifted, in the data exchange position, through the through-openings 8 for bearing against the inserted chip card 3. A card stop 11 at the front of the contact carrier 5 projects up into the card path, with the result that the contact carrier 5 is carried along by the inserted chip card 3 in the insertion direction 6 up to its end position and is lifted thereby to lift the contacts 4 through the through-openings 8 thereof for bearing against the inserted chip card 3 (FIG. 2b). After the data exchange, the chip card 3 is moved back counter to the insertion direction 6, as a result of which the contact carrier 5, driven by the restoring spring, is pushed back into its starting position.

Figure 2A:
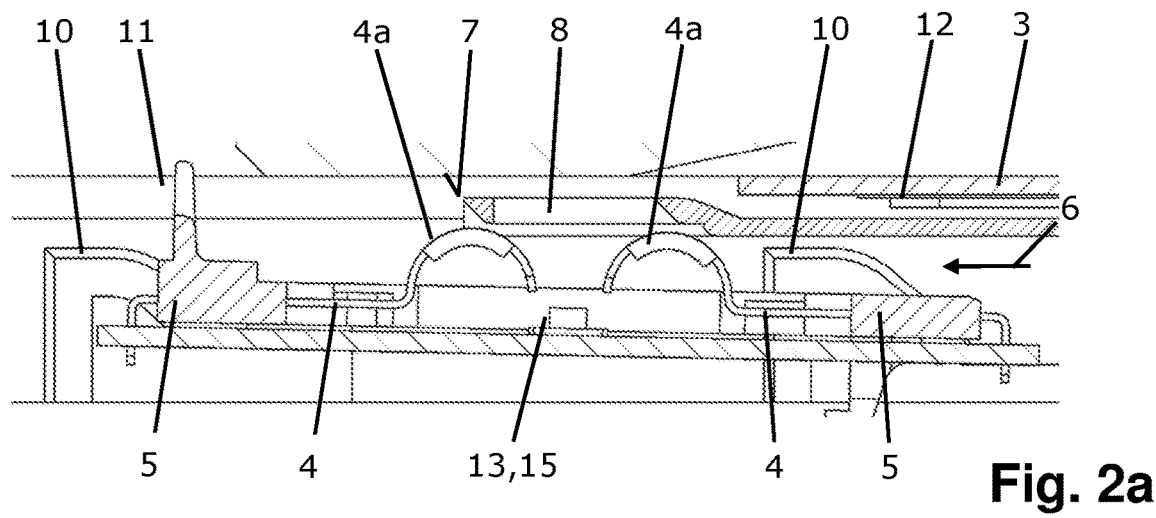
FIGS. 2a-2c show the card reader shown in FIG. 1 with a chip card that has not yet reached its data exchange position in FIG. 2a and is shown in its data exchange position in FIG. 2b, and with a manipulation foil (FIG. 2c)
Figure 2B:
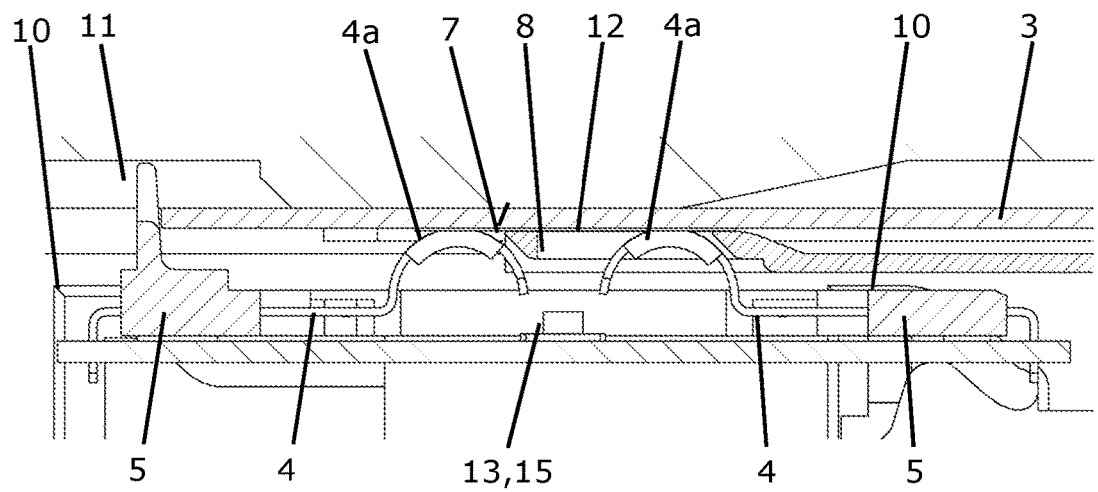
Figure 2C:
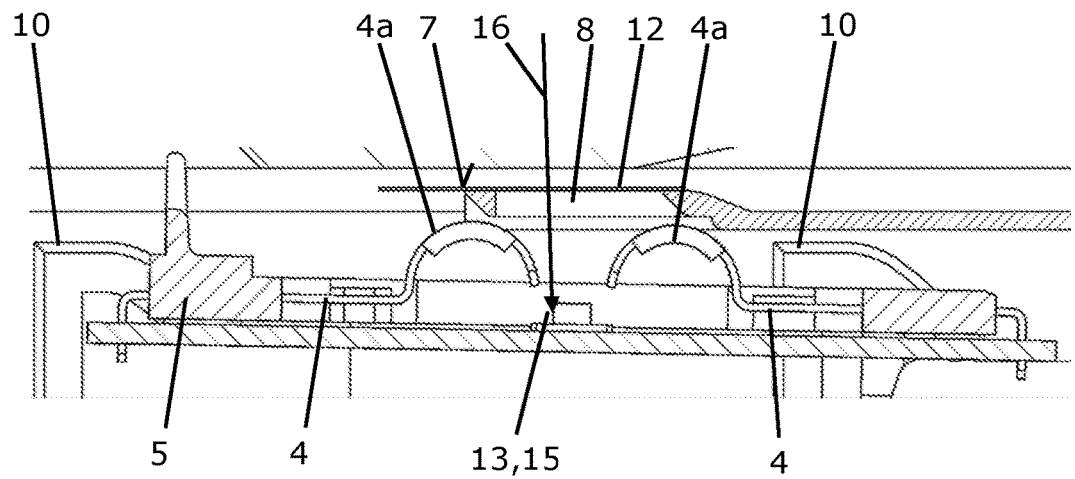

As is shown in FIG. 2a, a manipulation foil 12 having an adhesive underside can be applied onto the underside of the chip card 3 for manipulation purposes (FIG. 2a). When the contact carrier 5 is lifted, the contacts 4 are pushed against the manipulation foil 12, which adheres thereto (FIG. 2b). When the contact carrier 5 is lowered, the manipulation foil 12 is detached from the contacts 4 by way of the bearing face 7 and then adheres to the large-area bearing face 7 (FIG. 2c). If a chip card 3 is inserted again, the contacts 4 then bear against the contact fields of the chip card 3 via the interposed manipulation foil 12. The manipulation foil 12 has electrical vias (not shown) in the region of the contacts 4 that continue to maintain the electrical connection between the contacts 4 and the contact fields. In addition, the manipulation foil 12 carries an interface (not shown) that is retrievable from the outside (e.g. in the form of a transmitter) and that is connected to the via assigned to the I/O contact 4' to read the data transmitted via the I/O contact 4' for manipulation purposes.

To detect such a manipulation attempt, the card reader 1 furthermore has a detector device 13 in the form of a one-way light barrier that radiates through the through-opening 8 of the I/O contact 4'. The one-way light barrier 13 consists of a light radiation source 14 and a sensor 15 for this radiation. The light radiation source 14 can be formed, for example, by a fixed fibre end of a light guide (not shown), with light from a light source (not shown) being coupled into the other end of said light guide. The light beam 16 emitted by the light radiation source 14 passes through the through-opening 8 of the I/O contact 4' and is incident on the sensor 15, which is attached to the displaceable contact carrier 5.

Every time an inserted chip card 3 is ejected again from the card reader 1, the one-way light barrier 13 checks whether an attack by a manipulation foil 12 has taken place. The light radiation source 14 is arranged on the card reader housing 2 such that the light beam 16 in the starting position of the contact carrier 5, that is to say when a chip card 3 has not been inserted, passes through the through-opening 8 exactly at the position where the contact face 4a of the I/O contact 4' is located in the data exchange position. The sensor 15 is arranged on the contact carrier 5 between the two contact rows such that the light beam 16 is incident thereon in the starting position of the contact carrier 5. An interruption or attenuation of the light beam 16 ascertained by the sensor 15 is detected as a shimming attack by monitoring electronics of the detector device 13, which then no longer permits a reading process of the card reader 1.

Figure 3:
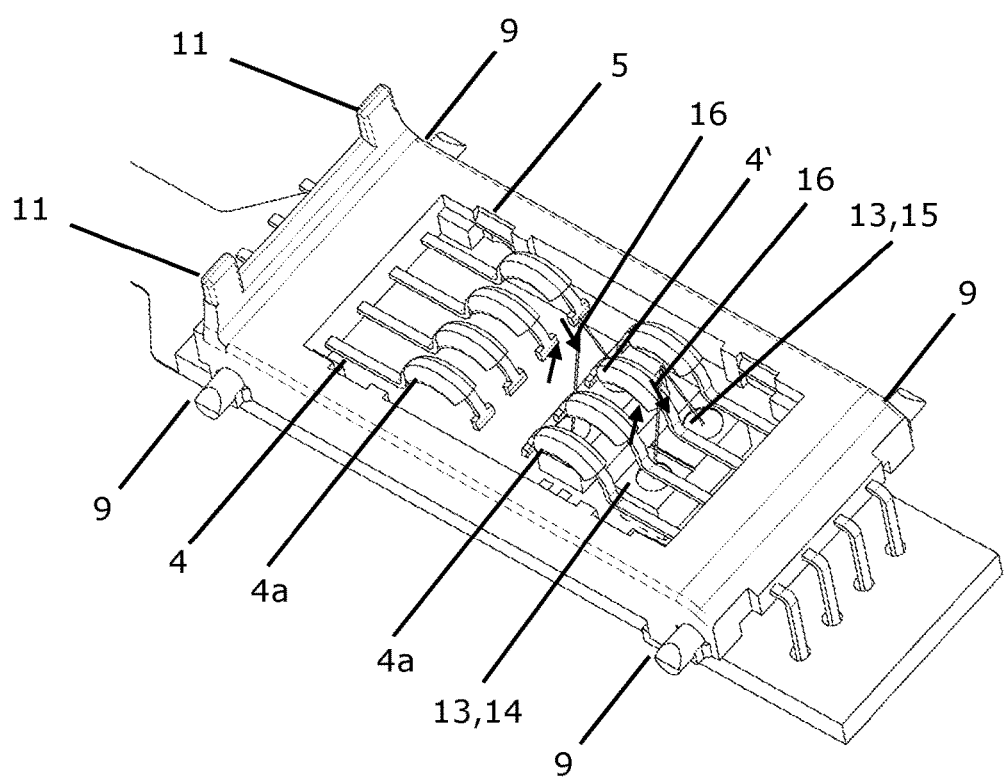
FIG. 3 shows the contact carrier of the card reader according to the invention with a detector device consisting of two reflection light barriers in a perspective view from above.

As is shown in FIG. 3, the detector device 13 can also be embodied as a reflection light barrier, directed at the through-opening 8, with a light radiation source 14 and a sensor 15, which are both arranged either on the displaceable contact carrier 5 or fixedly on the card reader housing 2. If a manipulation foil 12 is present, the light beam 16 is reflected at the manipulation foil 12 and is then incident on the sensor 15, which is detected as a shimming attack by the monitoring electronics, which then no longer permits a reading process of the card reader 1. In the exemplary embodiment shown, the detector device 13 has two reflection light barriers, which are directed at different regions of the through-opening 8 of the I/O contact 4'.

Rather than being arranged on the displaceable contact carrier 5, the sensor 15 can alternatively be arranged fixedly on the card reader housing 2 if the sensor 15 is impinged by the light beam 16 in the starting position of the contact carrier 5.

As an alternative to the light barrier, the detector device 13 can also be embodied as a camera to subject the through-opening 8 of the I/O contact 4' to a target-actual comparison. An image is recorded using the camera in each case before and after the insertion of a chip card 3 and then subsequently compared to one another. Any deviation that is ascertained in the comparison is detected as a shimming attack by the monitoring electronics, which then no longer permits a reading process of the card reader 1.

The detector device 13 can also be embodied as an inductive sensor directed at the through-opening 8 to subject the through-opening 8 of the I/O contact 4' to a target-actual comparison. The inductive sensor compares the electromagnetic field in the through-opening 8 of the I/O contact 4' in each case before and after the insertion of a chip card 3. Any deviation that is ascertained in the comparison is detected as a shimming attack by the monitoring electronics, which then no longer permits a reading process of the card reader 1.

In the exemplary embodiment with displaceable contacts 4 shown in FIGS. 1 to 3, the detector device 13 is directed at the position 17 (FIG. 1a) in the card reader 1 at which the contact face 4a of the I/O contact 4' is located in the data exchange position and/or is directed at the region around this position 17. In the case of contacts 4 being arranged fixedly in the card reader housing 2 and in the absence of a bearing face, the detector device 13 is directed, in contrast, at the contact face 4a of the I/O contact 4' and/or at the region around this contact face 4a to detect in this way a manipulation foil 12 that is adhesively bonded to the contact faces 4a of the contacts 4.

What is claimed is:

1. A card reader for data exchange with a chip card that has been inserted into a card reader housing up to a data exchange position, the card reader comprising:
    at least one electrical card reader contact that is arranged fixedly in the card reader housing;
    a bearing face, against which the inserted chip card bears in the data exchange position; and
    at least one detector device selected from a group consisting of a one-way light barrier, a reflection light barrier, a camera, and an inductive sensor;
    wherein, in the data exchange position, the at least one electrical card reader contact reaches through a through-opening in the bearing face and projects into a card path of the inserted chip card by way of a contact face; and
    wherein the at least one detector device is directed, through or at the through-opening, at the contact face of the at least one electrical card reader contact or at the region around said contact face;
    wherein the at least one detector device is configured to detect contact-freely whether a manipulation foil is adhered to the bearing face when the chip card is not in the data exchange position.

2. The card reader according to claim 1, wherein the card reader housing has the bearing face.

3. The card reader according to claim 1, wherein the at least one contact is attached to a contact carrier, which is guided in the card reader housing so as to be displaceable in the insertion direction of the chip card between a starting position and an end position and is carried along by an inserted chip card up to the end position in which the at least one contact is moved through the through-opening for bearing against the inserted chip card.

4. The card reader according to claim 3, wherein at least one part of the at least one detector device is attached to the displaceable contact carrier.

5. The card reader according to claim 1, wherein at least one part of the at least one detector device is attached fixedly to the card reader housing.

6. The card reader according to claim 1, wherein the at least one electrical card reader contact comprises at least two electrical contacts, wherein the at least one detector device is disposed between the at least two electrical contacts.

7. The card reader according to claim 1, wherein the at least one detector device is configured to detect whether the manipulation foil is adhered to the bearing face when the chip card is not in the data exchange position without making physical contact to the manipulation foil.

8. A card reader for data exchange with a chip card that has been inserted into a card reader housing up to a data exchange position, comprising:
    at least one electrical card reader contact that is arranged displaceably in the card insertion direction;
    a bearing face, against which the inserted chip card bears in the data exchange position; and
    at least one detector device selected from a group consisting of a one-way light barrier, a reflection light barrier, a camera, and an inductive sensor;
    wherein, in the data exchange position, the at least one card reader contact reaches through a through-opening in the bearing face and projects into a card path of the inserted chip card by way of a contact face; and
    wherein the at least one detector device is directed, through or at the through-opening, at a position in the card reader at which the contact face is located in the data exchange position, or is directed, through or at the through-opening, at the region around this position;
    wherein the at least one detector device is configured to detect contact-freely whether a manipulation foil is adhered to the bearing face without making physical contact to the manipulation foil.

9. The card reader according to claim 8, wherein the card reader housing has the bearing face.

10. The card reader according to claim 8, wherein the at least one contact is attached to a contact carrier, which is guided in the card reader housing so as to be displaceable in the insertion direction of the chip card between a starting position and an end position and is carried along by an inserted chip card up to the end position in which the at least one contact is moved through the through-opening for bearing against the inserted chip card.

11. The card reader according to claim 10, wherein at least one part of the at least one detector device is attached to the displaceable contact carrier.

12. The card reader according to claim 8, wherein at least one part of the at least one detector device is attached fixedly to the card reader housing.

13. The card reader according to claim 8, wherein the at least one electrical card reader contact comprises at least two electrical contacts, wherein the at least one detector device is disposed between the at least two electrical contacts.

14. The card reader according to claim 8, wherein the at least one detector device is configured to detect whether the manipulation foil is adhered to the bearing face without making physical contact to the manipulation foil when the chip card is not in the data exchange position.

15. A card reader for data exchange with a chip card that has been inserted into a card reader housing up to a data exchange position, the card reader comprising:
    at least one electrical card reader contact that is arranged fixedly in the card reader housing;
    a bearing face, against which the inserted chip card bears in the data exchange position; and
    at least one optical detector device selected from a group consisting of a one-way light barrier, a reflection light barrier, and a camera;
    wherein, in the data exchange position, the at least one electrical card reader contact reaches through a through-opening in the bearing face and projects into a card path of the inserted chip card by way of a contact face;
    wherein the at least one optical detector device is directed, through or at the through-opening, at the contact face of the at least one electrical card reader contact or at the region around said contact face; and
    wherein the at least one optical detector device is configured to detect optically whether a manipulation foil is adhered to the bearing face when the chip card is not in the data exchange position.

16. A card reader for data exchange with a chip card that has been inserted into a card reader housing up to a data exchange position, comprising:
    at least one electrical card reader contact that is arranged displaceably in the card insertion direction;

a bearing face, against which the inserted chip card bears in the data exchange position; and at least one optical detector device selected from a group consisting of a one-way light barrier, a reflection light barrier, and a camera;

wherein, in the data exchange position, the at least one card reader contact reaches through a through-opening in the bearing face and projects into a card path of the inserted chip card by way of a contact face;

wherein the at least one optical detector device is directed, through or at the through-opening, at a position in the card reader at which the contact face is located in the data exchange position, or is directed, through or at the through-opening, at the region around this position; and wherein the at least one optical detector device is configured to detect optically whether a manipulation foil is adhered to the bearing face without making physical contact to the manipulation foil.

* * * * *

UNITED STATES PATENT AND TRADEMARK OFFICE
CERTIFICATE OF CORRECTION

| | |
|---|---|
| PATENT NO. | : 11,537,802 B2 |
| APPLICATION NO. | : 16/848545 |
| DATED | : December 27, 2022 |
| INVENTOR(S) | : Karl-Rudolf Hopt |

It is certified that error appears in the above-identified patent and that said Letters Patent is hereby corrected as shown below:

On the Title Page

Item [54], "DETECTON" should read --DETECTION--.

In the Specification

Column 1, Line 2, "DETECTON" should read --DETECTION--.

Signed and Sealed this
Fourteenth Day of March, 2023

Katherine Kelly Vidal
*Director of the United States Patent and Trademark Office*